United States Patent [19]
Poisson et al.

[11] 3,973,858

[45] Aug. 10, 1976

[54] PNEUMATIC CONTROL DEVICE FOR TERMINATING THE MACHINING OPERATION OF A SPINDLE MACHINE

[75] Inventors: Bernard Poisson; Guy Steydlé, both of Boulogne-Billancourt, France

[73] Assignees: Regie Nationale des Usines Renault, Boulogne-Billancourt; Automobiles Peugeot, Paris, both of France

[22] Filed: June 12, 1975

[21] Appl. No.: 586,219

[30] Foreign Application Priority Data

June 14, 1974 France .......................... 74.20759

[52] U.S. Cl. .................................. 408/11; 90/11 E; 144/32 R; 408/10; 408/12; 408/14
[51] Int. Cl.² ...................... B23B 39/04; B23B 49/00
[58] Field of Search ................. 408/115, 56, 14, 15, 408/3, 8, 10, 11, 12; 269/87.3; 90/11 E

[56] References Cited
UNITED STATES PATENTS

| | | |
|---|---|---|
| 1,422,031 | 7/1922 | Caulkins .............................. 408/8 |
| 2,527,968 | 10/1950 | Sherman et al. .................. 408/56 X |
| 3,241,402 | 3/1966 | Crowell et al. .................... 408/14 X |
| 3,487,729 | 1/1970 | Juhasz et al. ......................... 408/14 |
| 3,767,313 | 10/1973 | Bohoroquez et al. ............... 408/14 |
| 3,821,921 | 7/1974 | Rosenberg ...................... 90/11 E X |

*Primary Examiner*—Othell M. Simpson
*Assistant Examiner*—W. R. Briggs
*Attorney, Agent, or Firm*—Fleit & Jacobson

[57] ABSTRACT

The invention relates to a pneumatic device for controlling the termination of an operation on a workpiece by means of the spindle of a machine. Said device comprises, around the front or tool end of the spindle, a sleeve provided with a front seal adapted, at the end of the operation, to engage the workpiece or a jig clamping same, so as to form with said workpiece or jig a closed, sealed space supplied with compressed air, an air exhaust port opening into said space and being adapted to be connected to a pneumatic receiver for controlling the end of the operation.

7 Claims, 7 Drawing Figures

PNEUMATIC CONTROL DEVICE FOR TERMINATING THE MACHINING OPERATION OF A SPINDLE MACHINE

The present invention relates in general to means for automatically controlling the end of a machining operation performed on a workpiece by means of a machine spindle, such as the spindle of a drilling or screwing machine, and is directed more particularly to an improved pneumatic device for controlling the termination of an operation on a spindle machine of this general type.

As a rule, when it is desired to stop the operation of a spindle at the end of the predetermined or desired stroke thereof, either electromechanical devices or simpler devices especially of the pneumatic type are used; in this last instance, the devices comprise a leakage orifice of relatively small diameter adapted, when closed by some valve means, to create a pressure increment. However, a known drawback of these pneumatic devices is that they are liable to be occluded or actuated accidentally.

It is the primary object of the present invention to provide a pneumatic control device free of the above-defined inconvenience and characterized essentially in that it comprises around the tool end of the spindle a sleeve provided with a front seal or packing adapted, at the end of the preset operation, to engage the workpiece or a jig or like mounting in which the workpiece is fitted or clamped, so as to constitute with the workpiece or jig closed chamber supplied with compressed air, an air exhaust conduit adapted to be connected to a pneumatic receiver for controlling the end of the machining operation opening into said chamber.

This arrangement is furthermore particularly advantageous in the case of a pneumatic action spindle, for it is thus possible to recover the exhaust air from the spindle for actuating the control device.

In addition, with this invention it is a simple matter to provide a digital counter in case of repeated or multiple operations to be performed in succession by means of a same spindle.

Several forms of embodiment of the pneumatic control devices of this invention will now be described by way of example with reference to the attached drawing, in which.

Figure 1:
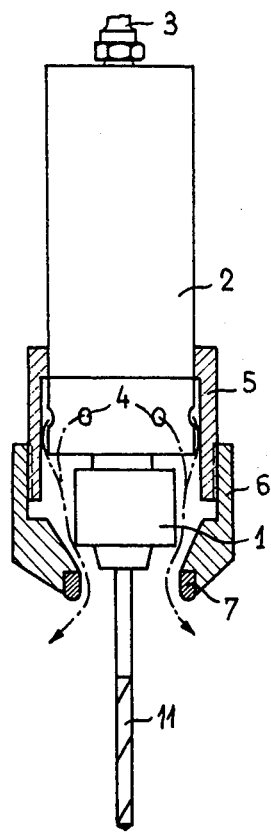
FIG. 1 is an elevational view of the spindle of a pneumatic driller and its pneumatic control device, the latter being shown in axial section.
Figure 2:
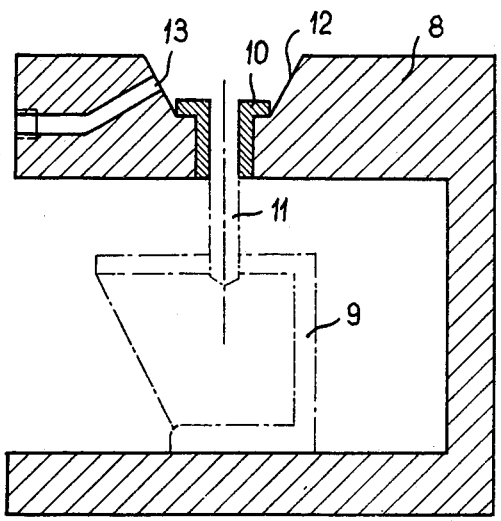
FIG. 2 is a sectional view showing in axial section a drilling jig or mounting complementary to the device shown in FIG. 1.

The pneumatic drill illustrated in FIG. 1 comprises a tool carrier spindle 1 rotatably mounted in a body 2 supplied with compressed air through a union 3 and provided with exhaust orifices 4 for the spindle driving air. An exhaust manifold 5 is secured to said body 2 and comprises screw-threads for securing thereto a sleeve 6 thus adapted to be adjusted in the axial direction about the nose or tool end of the spindle. This sleeve 6 is provided with an annular front seal or packing 7 of suitable material, such as an elastomeric material, adapted to co-act with a drilling jig, mounting or templet, such as the one illustrated at 8 in FIG. 2, under the conditions shown in FIG. 3.

The jig or mounting 8 in which the workpiece 9 to be drilled is adapted to be clamped in any suitable manner comprises a socket 10 for guiding the twist-drill 11. This guide socket 10 constitutes an insert fitted in the bottom of a frustoconical cavity 12 having formed in its wall a port 13 adapted to be connected to a pneumatic receiver (not shown) adapted for example to record a signal or the action of a control member indicating the end of a drilling operation.

Figure 3:
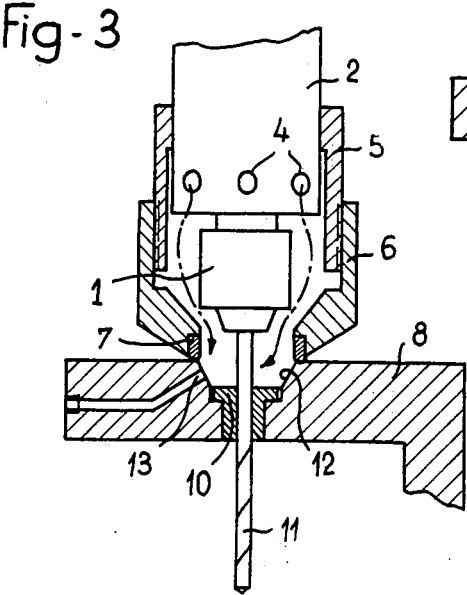
FIG. 3 is an explanatory view showing the mode of operation of the control device of FIGS. 1 and 2.

In fact, referring to FIG. 3, it will be seen that when the tool has completed its predetermined stroke the seal 7 engages the top surface of the jig or mounting 8 around the cavity 12 thereof, and since the drill 11 then acts as a valve member occluding the guide socket 10, the pressure of the exhaust air from the spindle rises rapidly in the space bounded by the spindle body 2, the exhaust manifold 5 and the sleeve 6, in conjunction with the cavity 12 of jig 8 and the adjacent port 13 for the control air which is connected to the pneumatic receiver (not shown), whereby the latter is properly actuated at the end of the actual drilling operation.

Figure 4:
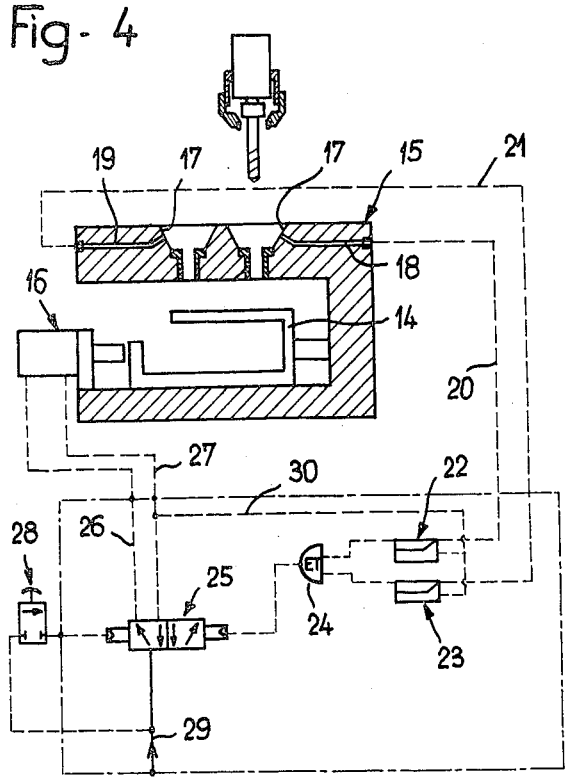
FIG. 4 is a general diagrammatic view showing a pneumatic device for controlling multiple machining operations performed by means of a same spindle.

FIG. 4 illustrates a typical application of this pneumatic control device in the case of multiple drilling operations to be performed in succession by a same spindle on a same workpiece.

This example is given in the case of two drilling operations to be performed in a workpiece 14 which, for this purpose, is positioned and clamped in a mounting jig 15 comprising a double-acting pneumatic actuator 16 for clamping and releasing the workpiece.

This mounting jig 15 comprises two twist-drill guide sockets forming a pair of inserts in the bottom of corresponding cavities 17 having formed in their frustoconical walls ports connected via separate conduits or passages 18 and 19 to a logic fluid control device for releasing the workpiece automatically at the end of the drilling operation. These conduits 18, 19 are connected via pipe lines 20, 21 respectively to one of the control inputs of a pair of pneumatic memories 22, 23 having their outputs connected in turn to the two inputs of a logic AND unit 24 having its output adapted to control pneumatically a control pulse-responsive distributor 25 having two distributing positions illustrated in the drawing, this distributor being connected via other pipe lines 26, 27 respectively to the two sides of the piston of the double-acting pneumatic unit or actuator 16.

The distributor position illustrated in FIG. 4 is obtained pneumatically by means of a manually controlled valve 28 connected to the line 29 supplying compressed air to said distributor 25, this position ensuring the clamping of the workpiece 14 in its mounting jig 15 under the operator's control.

After drilling a first hole as contemplated, the corresponding pneumatic memory is actuated through the control air line 20 or 21 and when both memories 22, 23 are thus actuated, the AND unit 24 causes the distributor 25 to be shifted to its other distribution position corresponding to a reversal and therefore to the automatic release of workpiece 14. It will be seen that pipe line 27, then under pneumatic pressure, is connected via another line 30 to another pair of inputs of said pneumatic memories 22, 23, in order to reset or tilt said memories to a position preventing any supply of compressed air to said AND unit 24, so that another workpiece clamping operation can subsequently be controlled by the operator by simply actuating the valve 28.

Thus, a number of holes can be drilled in a workpiece without resorting to a checking step after each machining operation, whether the holes are drilled successively or simultaneously.

Figure 5:
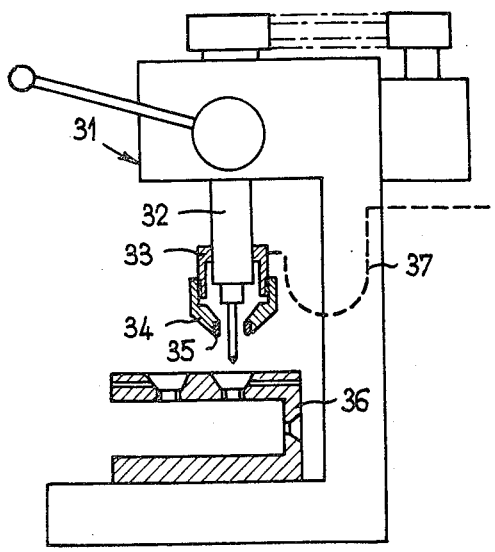
FIG. 5 is part-elevational, part-sectional view of a similar control device for a sensitive drilling machine.

FIG. 5 illustrates a similar application of a control device in the case of a sensitive drilling machine wherein the spindle body 32 is provided with an end piece 33 to which a sleeve 34 provided with a front seal or packing 35 is mounted and adjustable by screwing. Also in this example the seal or packing 35 is adapted to co-act with a drilling mounting or jig 36. In this arrangement, a compressed air supply for the control device is required, and this supply is provided for through a pipe line 37 connected to said end piece 33.

Figure 6:
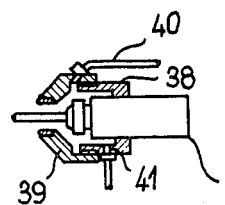
FIG. 6 is an axial section showing an electric hand-drill with its control device shown in axial section.

Similarly, in the case of an electric hand-drill illustrated in FIG. 6, the mandrel is provided with an end piece 38 to which an adjustable sleeve 39 connected via a pipe line 40 to a source of compressed air (not shown) is mounted.

In this instance it will be noted that the control device according to this invention does not necessarily implies the use of a mounting or jig, or the collection of an operation termination signal via said mounting or jig, for it is also applicable in the absence of such tool guiding jig, the control air exhaust conduit being in this case also formed in the end piece, as shown at 41 in FIG. 6, and connected to a pneumatic receiver (not shown) constituting the signal recording member or a member for controlling the termination of the drilling operation.

In the case of multiple operations of which it is desired to ascertain the proper and complete accomplishment, one may use in the known fashion a pulse counter delivering a signal each time the total number of operations is obtained, the device indicating the achievement of each operation by delivering a pulse of compressed air, the counter being reset or zeroed at the end of each cycle.

Figure 7:
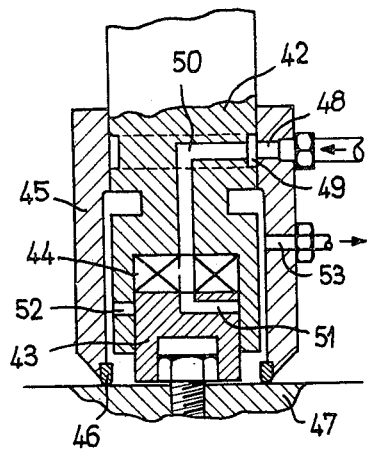
FIG. 7 is an axial section showing a screwdriver equipped with the pneumatic control device of this invention.

FIG. 7 illustrates the application of the present invention to a power screwdriver spindle or mandrel wherein the rotary spindle 42 drives in the conventional manner a screwdriver socket 43 through a torque-limiting coupling 44 of any suitable type, such as a spring-type or friction-type coupling.

Mounted around the spindle for free rotation in relation thereto is a sleeve 45 provided with a front seal or packing 46 adapted to co-act with the surface of member 47 of the assembly to be screwed.

The sleeve 45 comprises a radial port 48 for receiving compressed air from a supply line, and this port 48 communicates via an annular groove 49 with a passage 50 formed in said spindle and leading to another radial port or passage 51 formed in the screwdriver socket 43. This port or passage 51 opens thus radially into the bore receiving said socket 43 at a location somewhat spaced angularly from another radial port 52 formed through the side wall of the spindle and opening into the annular space formed between the spindle 42 and sleeve 45. This angular offset is normally preserved when the torque-limiting coupling is in the normally screwed position, and it is only when the coupling yields at the end of the screwing operation that ports 51 and 52 register with each other. As a result, compressed air is allowed to penetrate into the annular space closed by sleeve 45 and seal 46 engaging the workpiece 47, whereby this air can actuate via a control air exhaust passage 53 formed in the sleeve 45 the pneumatic receiver controlling in turn the termination of the screwing operation.

Although specific forms of embodiment of this invention have been described herein-above and illustrated in the accompanying drawing, it will readily occur to those skilled in the art that various modifications and changes may be brought thereto without departing from the scope of the invention as set forth in the appended claims.

What is claimed as new is:

1. A pneumatic control device for terminating the machining operation of a machine tool having a spindle comprising, in combination, a sleeve disposed in surrounding relationship with the tool end of the spindle, a front seal on the forward end of said sleeve, said front seal being engageable in sealing relationship with a workpiece or a jig accommodating a workpiece to form therewith a closed, sealed chamber having an inner wall at the end of the machining operation, a port in said chamber inner wall, supply means for introducing compressed air into said chamber, conduit means connected to said port for exhausting the compressed air from said chamber and a pneumatic receiver connected to said exhaust conduit means for controlling the end of the machining operation.

2. A control device as set forth in claim 1 wherein the machine tool is provided with a pneumatically driven spindle and wherein said compressed air supply means comprises the exhaust air of said spindle introduced internally into said sleeve.

3. A control device as set forth in claim 1 wherein said compressed air supply means comprises an external source of compressed air to said sleeve.

4. A control device as set forth in claim 1 wherein said conduit means for the control exhaust air is formed in said sleeve.

5. A control device as set forth in claim 1 wherein said conduit mesns for the control exhaust air is formed in the jig.

6. A control device as set forth in claim 5 wherein the machine tool includes a tool guide passage having an inlet and wherein said conduit means for the control exhaust air is formed at said tool guide passage inlet.

7. A control device as set forth in claim 1 wherein the machine tool comprises a power screwdriver having a spindle, the screwdriver including a screwdriver socket and a torque limiting coupling drivably connected to the socket, the spindle and the screwdriver socket having a plurality of conduits and passages communicating with the compressed air supply means, said conduits and passages being adapted to communicate with one another for interrupting the driving connection of the torque limiting coupling at the end of the operation of the screwdriver.

* * * * *